United States Patent

Haas et al.

(10) Patent No.: US 7,622,542 B2
(45) Date of Patent: Nov. 24, 2009

(54) PLASTIC MOLDINGS FROM OPTIONALLY FILLED POLYURETHANES AND THEIR USE

(75) Inventors: Peter Haas, Haan (DE); Reiner Paul, Leichlingen (DE); Dirk Wegener, Monheim (DE)

(73) Assignee: Bayer MaterialScience AG, Leverkusen (DE)

( * ) Notice: Subject to any disclaimer, the term of this patent is extended or adjusted under 35 U.S.C. 154(b) by 558 days.

(21) Appl. No.: 11/300,123

(22) Filed: Dec. 14, 2005

(65) Prior Publication Data

US 2006/0135726 A1  Jun. 22, 2006

(30) Foreign Application Priority Data

Dec. 17, 2004  (DE)  ........................ 10 2004 060 800

(51) Int. Cl.
*C08G 18/06* (2006.01)
*C08G 18/16* (2006.01)
*C08G 18/30* (2006.01)
*C08G 18/40* (2006.01)
*C08G 18/48* (2006.01)

(52) U.S. Cl. .............................. 528/85; 528/48; 528/76; 528/77; 528/80; 521/128; 521/163; 521/170; 521/174

(58) Field of Classification Search ................. 521/128, 521/129, 137, 170, 174, 163; 528/48, 77, 528/80, 85, 76

See application file for complete search history.

(56) References Cited

U.S. PATENT DOCUMENTS

| 4,299,924 A | | 11/1981 | Nomura et al. ............. 521/131 |
| 5,977,198 A | * | 11/1999 | Hettel et al. ................. 521/174 |
| 6,590,007 B2 | * | 7/2003 | Herrmann et al. ........... 521/137 |

FOREIGN PATENT DOCUMENTS

| CA | 2037082 | 9/1991 |
| DE | 198 11 471 A1 | 9/1999 |
| EP | 0 102 541 A2 | 3/1984 |

* cited by examiner

*Primary Examiner*—Vasu Jagannathan
*Assistant Examiner*—Benjamin Gillespie
(74) *Attorney, Agent, or Firm*—N. Denise Brown; Lyndanne M. Whalen; Noland J. Cheung

(57) ABSTRACT

The present invention relates to plastic moldings that are prepared from optionally filled polyurethanes. The plastic molding of the present invention exhibit high tenacity, flexural strength and heat stability. This invention also relates to a process for the preparation of these plastic moldings and specifically to a process for the production of large parts comprising these plastic moldings.

7 Claims, No Drawings

PLASTIC MOLDINGS FROM OPTIONALLY FILLED POLYURETHANES AND THEIR USE

CROSS REFERENCE TO RELATED PATENT APPLICATION

The present patent application claims the right of priority under 35 U.S.C. § 119 (a)-(d) of German Patent Application No. 10 2004 060 800.8, filed Dec. 17, 2004.

BACKGROUND OF THE INVENTION

The invention relates to plastic moldings prepared from optionally filled polyurethanes which exhibit high tenacity, flexural strength and heat stability. The present invention also relates to a process for the preparation of these plastic moldings, and to the production of large molded parts from these.

U.S. Pat. No. 4,299,924 describes a process for the production of polyisocyanurate (PIR) plastics which have a high heat stability, a high tenacity and a high flexural strength. The polyol component used consists of polymeric polyols modified by ethylenically unsaturated monomers such as styrene, acrylonitrile, etc. The polyols are processed with a high excess of isocyanate or high indices in order to produce the plastics. As a result, the volumetric flow rates are several times greater on the isocyanate side than on the polyol side, which leads to considerable production engineering problems.

SUMMARY OF THE INVENTION

The object of the present invention was to produce moldings, especially large moldings, with equalized metering flow rates, while at the same time improving the properties such as tenacity, heat stability and flexural strength, and lengthening the shot times.

The object could be achieved with the plastic moldings according to the invention.

The present invention therefore provides plastic moldings from optionally filled polyurethanes, in which the polyurethane comprises the reaction product of:

a) at least one polyisocyanate and/or isocyanate prepolymer;

b) at least one isocyanate-reactive components comprising:
   b1) at least one conventional polyol component, and at least one filler containing polyol component selected from the group of:
   b2) one or more polyol dispersions containing polyurea, and/or
   b3) one or more polydispersions containing polyisocyanate polyaddition products with alkanolamines;

c) at least one chain extender and/or crosslinking agent;

d) at least one trimerization catalyst;

e) optionally, one or more urethane catalysts;

f) optionally, one or more blowing catalysts;

g) optionally, one or more stabilizers and/or auxiliary substances; and h) optionally, one or more reinforcing agents.

The presence of the components b2) and/or b3) in these formulations, and especially the PHD dispersions b2), result in longer gelling times, a higher heat stability and high flexural strengths, even when the isocyanate indices are lower.

The filler content, based on the particular polyol component b2) or b3), ranges from about 2 to about 40 wt. %, preferably from about 3 to about 30 wt. %, of PHD or PIPA filler, respectively.

The isocyanate index ranges between 150 and 1000 (isocyanate index: molar ratio of NCO groups to groups reactive towards NCO, multiplied by one hundred).

DETAILED DESCRIPTION OF THE INVENTION

Starting materials which are suitable to be used component a) in accordance with the present invention for the production of the polyurethane moldings include, for example, aliphatic, cycloaliphatic, araliphatic, aromatic and heterocyclic polyisocyanates. Such polyisocyanates include those described by, e.g., W. Siefken in Justus Liebigs Annalen der Chemie, 562, pages 75 to 136, and those which correspond, for example, to the formula:

$Q(NCO)_n$ in which
n represents 2 to 4, preferably 2,
and
Q represents an aliphatic hydrocarbon radical having 2 to 18 C atoms, preferably 6 to 10 C atoms; a cycloaliphatic hydrocarbon radical having 4 to 15 C atoms, preferably 5 to 10 C atoms; an aromatic hydrocarbon radical having 6 to 15 C atoms, preferably 6 to 13 C atoms; or an araliphatic hydrocarbon radical having 8 to 15 C atoms, preferably 8 to 13 C atoms.

Suitable polyisocyanates such as these include those described in, for example, DE-OS 2 832 253, pages 10-11, which is believed to correspond to U.S. Pat. No. 4,263,408, the disclosure of which is hereby incorporated by reference.

Particularly preferred polyisocyanates include, as a rule, the technically readily available polyisocyanates such as, for example, 2,4- and/or 2,6-toluene diisocyanate as well as any desired mixtures of these isomers ("TDI"), polyphenylpolymethylene polyisocyanates such as those prepared by aniline/formaldehyde condensation and subsequent phosgenation ("crude MDI"), and polyisocyanates having carbodiimide groups, urethane groups, allophanate groups, isocyanurate groups, urea groups and/or biuret groups (i.e. the so-called "modified polyisocyanates"), and most preferably, the modified polyisocyanates derived from 2,4- and/or 2,6-toluene diisocyanate or from 4,4'- and/or 2,4'-diphenylmethane diisocyanate.

The content of said groups for modifying the polyisocyanate can be up to 30 wt. %, based on the isocyanate used.

Suitable polyols to be used as components b2) and b3) herein include the "polymer-modified" PHD or PIPA polyols which are known per se. Dispersions of higher-molecular hydroxyl compounds containing polymers are preferred. The dispersions are preferably prepared by reacting polyisocyanates with polyamines and/or hydrazines, or with alkanolamines having primary and/or secondary amino groups, in a base compound of molecular weight 400 to 10,000 having 1 to 8 primary and/or secondary hydroxyl groups.

Such dispersions of higher-molecular hydroxyl compounds containing polymers are known and described in, for example, DE-AS 25 19 004, DE-OS 25 50 796, DE-OS 25 50 797, DE-OS 25 50 860, DE-OS 25 50 833, DE-OS 25 50 862, DE-OS 26 38 759, DE-OS 26 39 254, U.S. Pat. No. 4,374,209, the disclosure of which is hereby incorporated by reference, EP-A 0 079 115 and U.S. Pat. No. 4,381,351, the disclosure of which is hereby incorporated by reference. The DE-OS 25 50 796 is believed to correspond to U.S. Pat. No. 4,305,857 and U.S. Pat. No. 4,310,449, the disclosures of which are hereby incorporated by reference; the reference DE-OS 25 50 797 is believed to correspond to U.S. Pat. No. 4,147,680, U.S. Pat. No. 4,305,858 and U.S. Pat. No. 4,310,448, the disclosures of which are hereby incorporated by reference; the reference DE-OS 25 50 860 is believed to correspond to U.S. Pat. No. 4,092,275 and U.S. Pat. No. 4,184,990, the disclosures of which are hereby incorporated by reference; the references DE-OS 25 50 833 and DE-OS 25 50 862 are believed to correspond to U.S. Pat. No. 4,089,835, the disclosure of which is hereby incorporated by reference; the reference DE-OS 26 38 759 is believed to correspond to U.S. Pat. No. 4,324,716, the disclosure of which is hereby incorporated by reference; and the reference DE-OS 26 39 254 is believed to correspond to U.S. Pat. No. 4,206,109 and U.S. Pat. No. 4,260,530, the disclosures of which are hereby incorporated by reference.

Dispersions of reaction products of polyisocyanates and alkanolamines in polyethers, such as those described e.g. in DE-OS 3 103 757, the disclosure of which is hereby incorporated by reference, can also be used.

Component b1) of the isocyanate-reactive component b) preferably consists of polyetherpolyols and/or polyesterpolyols having a number-average molecular weight of 2000 to 16,000 and a functionality of 2 to 6.

Such polyether polyols and polyester polyols are known to those skilled in the art and are described in greater detail e.g. in G. Oertel, Kunststoffhandbuch, volume 7, Carl Hanser Verlag, 3rd edition, Munich/Vienna 1993, pp 57 to 75. These polyether polyols and/or polyester polyols are conventional polyether polyols and/or polyester polyols, and may be referred to as unfilled with regard to the solids content.

Suitable polyether chains can be synthesized in known manner by the alkoxylation of appropriate starter compounds, preferably using ethylene and/or propylene as the alkoxylating agents. The chosen starters are preferably compounds containing hydroxyl groups which give a starter functionality of 2 to 6 in the case of the above-mentioned polyetherpolyols and/or polyesterpolyols. Examples of possible starter compounds are sorbitol, sucrose, pentaerythritol, glycerol, trimethylolpropane, propylene glycol, ethylene glycol, butylene glycol and water, the starter mixtures (or the added water) being measured so that the described functionalities result (or are obtained).

The polyesterpolyols are also synthesized in known manner by the polycondensation of polyfunctional carboxylic acids with appropriate hydroxyl compounds, by the polycondensation of hydroxycarboxylic acids, by the polymerization of cyclic esters (lactones), by the polyaddition of carboxylic anhydrides with epoxides, and by the reaction of acid chlorides with alkali metal salts of hydroxyl compounds. Preferably, the polyesters are prepared by the polycondensation of polyfunctional carboxylic acids such as phthalic acid, isophthalic acid, terephthalic acid, fumaric acid, glutaric acid, adipic acid and succinic acid, with suitable hydroxyl compounds such as ethylene glycol, diethylene glycol, tetraethylene glycol, 1,2-propanediol, 1,4-butanediol, 1,6-hexanediol, glycerol and trimethylolpropane.

Suitable compounds to be used as chain extenders c) in accordance with the present invention include preferably those having 2 to 6 hydroxyl groups per molecule and a molecular weight of 62 to 499. Examples which may be mentioned are ethylene glycol, butylene glycol, anhydrosorbitol, bis(hydroxyethyl)hydroquinone, bis(hydroxyethyl) bisphenol A, and particularly ethylene glycol, 1,4-butanediol, 1,3-butanediol and 1,4-bis(2-hydroxyethyl)-hydroquinone, glycerol, trimethylolpropane, pentaerythritol and their alkoxylation products or any desired mixtures thereof.

Possible catalysts e) and f) for the preparation of the polyurethanes are all the known catalysts and/or catalyst systems known in polyurethane chemistry. In this connection, reference is made e.g. to the above-cited Kunststoffhandbuch, volume 7 (Polyurethane), 3rd revised edition, Carl Hanser Verlag, Munich/Vienna 1993, page 104 et seq. Catalysts which may be mentioned in particular are those based on tertiary amines such as diazabicyclo[2.2.2]octane, N-methylimidazole, dimethylaminopropylamine, 1,5-diazabicyclo[4.3.0]non-5-ene and 1,8-diazabicyclo[5.4.0]undec-7-ene, as well as metal-organic compounds such as dialkyltin alkylmercaptides, dialkyltin carboxylates, tin(II) carboxylates, zinc carboxylates, dialkoxytitanium carboxylates and titanium acetylacetonate.

The trimerization catalysts d) used to synthesize isocyanurate units are preferably the alkali metal or ammonium carboxylates which are known per se. Some examples include potassium acetate and potassium 2-ethylhexanoate, as well as DABCO TMR from Air Products. Other catalysts are described in Kunststoffhandbuch 7, Carl Hanser Verlag, 3rd edition, 1993, p. 108.

The reinforcing agents h) used herein include those which are of an inorganic nature and have a laminar and/or acicular structure. In particular, they are silicates, e.g. calcium silicates of the wollastonite type and aluminium silicates of the mica and kaolin type. Such silicate-based reinforcing agents are known as sorosilicates, cyclosilicates, inosilicates or phyllosilicates and are described e.g. in Hollemann-Wiberg, W. de Gruyter Verlag (1985), pages 768-778.

Modified polyethersiloxanes, such as those described in Kunststoffhandbuch 7, Carl Hanser Verlag, 3rd edition, 1993, p. 113, can preferably be used as stabilizers g).

The moldings according to the invention can be produced by the known reaction injection molding technique (the RIM process), as described for example in DE-A 2 622 951 (U.S. Pat. No. 4,211,853) or DE-A 3 914 718. The quantitative ratios of the components containing NCO groups to the components containing NCO-reactive groups are preferably selected in such a manner that an isocyanate index of 150-1000 is obtained. Such a quantity of the reaction mixture is introduced into the mold that the moldings have a density of at least 0.8, and preferably 1.0 to 1.4 g/cm$^3$. The density also depends to a high degree on the type and quantity of the jointly used fillers.

The starting temperature of the reaction mixture introduced into the mold is generally in the range from 20 to 80° C. The temperature of the mold is generally in the range from 30 to 130° C., preferably 60 to 100° C. The molds used are known and preferably made of steel or aluminium or of metals coated with epoxide. To improve the demolding properties the inner walls can be coated with known mold-release agents.

The moldings produced in the mold can generally be released after a mold residence time of 20 to 300 seconds. Where appropriate, mold release is followed by tempering for 30 to 120 minutes at 60 to 180° C.

The plastic moldings according to the invention are particularly suitable, e.g., for large and particularly heat-stressed parts in the automobile and commercial vehicle industry.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components were used in the working examples:

PHD dispersion 1: a polyurea dispersion having a polyurea content of 20 wt. % and an OH number of 28 mg KOH/g, commercially available from Bayer MaterialScience AG SAN dispersion 1: a styrene/acrylonitrile dispersion having an SAN content of 20 wt. % comprising 8% of styrene and 12% of acrylonitrile, and having an OH number of 28 mg KOH/g, commercially available from Bayer Material-Science AG Polyether 1: a polyether having an OH number of 28, and being prepared by the addition of propylene oxide and ethylene oxide in a wt. ratio of 78/22 onto the starter trimethylolpropane, and containing predominantly primary OH groups Polyether 2: a polyether having an OH number 56, and being prepared by the addition of propylene oxide and ethylene oxide (in a wt. ratio of 50/50) onto the starter propylene glycol, and containing predominantly primary OH groups Polyether 3: a polyether having an OH number 37, and being prepared by the addition of propylene oxide and ethylene oxide (in a wt. ratio of 28/72) onto the starter glycerol, and containing predominantly primary OH groups NCO prepolymer 1: A prepolymer comprising the reaction product of (i) 90 pbw (0.675 mol of NCO) of a polyisocyanate prepared by the phosgenation of aniline/formaldehyde condensation products and having a viscosity of 320 cP at 25° C. and an NCO content of about 31.5% by wt., and (ii) 10 pbw (0.008 mol of OH) of a fatty acid ester comprising the reaction product of: 544 pbw of pentaerytritol, 3390 pbw of oleic acid and 292 pbw of adipic acid, wherein the resultant fatty acid was characterized by an OH number of 19.5, an acid number of 25.0 and a molecular weight of about 1246. The two components, i.e. (i) and (ii) were reacted at 70° C. The reaction mixture was kept at 70° C. for 4 hours, with stirring. When the reaction was complete, the NCO content of the polyisocyanate containing the reaction product was about 28%. This polyisocyanate prepolymer was prepared in accordance with Component E, the Isocyanate in the working examples of U.S. Published Application 20040127591, the disclosure of which is hereby incorporated by reference, and which is believed to correspond to DE-B 102 59 184.

Polycat 15: bis(3-N,N-dimethylaminopropyl)amine (urethane catalyst)

Reinforcing agent: wollastonite, commercially available as Rimgloss 1 from NYCO Minerals, Willsboro N.Y., USA Polyol temperature: 30 to 40° C.

Isocyanate temperature: 30 to 40° C.

Mold temperature: 85° C.

Mold residence time: 240 sec

The formulations described in Table 1 were processed by the reaction injection molding technique. After intense mixing in a positively controlled mixing head, the components were introduced under pressure via a gate into a heated plate mold having a temperature of 85° C. and the dimensions 300×200×3 mm using a high pressure metering device. Prior to the tests the mold was treated with the mold release agent Acmos 36-5130 from Acmos Chemie in Bremen.

TABLE 1

Compositions (all data are in parts by weight)

| | 1 | 2 | 3 | 4 | 5 | 6 | 7* |
|---|---|---|---|---|---|---|---|
| PHD dispersion 1 | 42.5 | 42.5 | 42.5 | 42.5 | 42.5 | 42.5 | |
| SAN dispersion 1 | | | | | | | 42.5 |
| Polyether 1 | | | | | | 44.5 | 44.5 |
| Polyether 2 | 43.5 | 42.5 | | | | | |
| Polyether 3 | — | — | 45 | 44.5 | 45.75 | | |
| 1,4-Butanediol | 12 | 10 | 10 | 10 | 10 | 10 | 10 |
| Diethylene glycol (DEG) | 2 | — | | | | | |
| Potassium acetate, 25 wt. % in DEG | 2.5 | 2.5 | 2.0 | 2.0 | 1.75 | 2.5 | 2.5 |
| Polycat 15 from Air Products | — | — | | | | 0.5 | 0.5 |
| Total "component A" | 102.5 | 97.5 | 99.5 | 99.0 | 100 | 100 | 100 |
| Wollastonite (reinforcing agent) | — | — | 45.7 | 45.9 | 45.1 | 45.7 | 45.7 |
| Isocyanate NCO prepolymer 1 | | | | | | | |
| Amount in parts by weight of NCO prepolymer 1 to 100 parts by weight of component A | 207 | 173 | 159 | 159 | 156 | 159 | 159 |
| NCO index | 350 | 350 | 350 | 350 | 350 | 350 | 350 |
| HDT value according to ISO 75-1/75-2 [° C.] | 185 | 160 | 172 | 185 | 180 | 171 | 149 |
| Charpy impact strength according to DIN EN ISO 179 [kJ/m²] | 12 | 36 | 43 | 45 | 24 | not broken | 25 |
| Flexural modulus according to DIN EN ISO 179 [N/mm²] | 1565 | 1626 | 2949 | 2309 | 2118 | 2150 | 2190 |
| Gelling time [sec] | 10 | 10 | 11 | 12 | 13 | 11 | 6 |

*comparative

PUR moldings containing PIR groups prepared from the PHD polyurea dispersions, result in products and materials having a high HDT (heat distortion temperature) value, a high flexural modulus, good tenacity properties, and a slow reaction behavior.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Plastic moldings comprising optionally filled polyurethanes, in which the polyurethane comprises the reaction product of:
   a) at least one polyisocyanate and/or polyisocyanate prepolymer;
   b) an isocyanate-reactive component comprising:
      b1) at least one polyol component,
      and at least one filler-containing polyol component selected from the group consisting of:
      b2) one or more polyol dispersions containing polyurea, and
      b3) at least one polydispersions containing polyisocyanate polyaddition products with alkanolamines;
   c) at least one chain extender and/or crosslinking agent and which contains from 2 to 6 hydroxyl groups per molecule and has a molecular weight of 62 to 499;
   d) at least one trimerization catalyst;
   e) optionally, one or more urethane catalysts;
   f) optionally, one or more blowing catalysts;
   g) optionally, one or more stabilizers and/or auxiliary substances;
   and
   h) optionally, one or more reinforcing agents;
wherein the isocyanate index is from 200 to 1000, and said moldings have a density of at least $0.8$ $g/cm^3$.

2. The plastic moldings of claim 1, wherein the solids contents of components b2) and/or b3) ranges from 2 to 40% by weight, based on the weight of components b2) and/or b3).

3. The plastic moldings of claim 2, wherein the solids contents of components b2) and/or b3) ranges from 3 to 30% by weight, based on the weight of components b2) and/or b3).

4. The plastic moldings of claim 1, wherein component a) comprises at least one aromatic polyisocyanate and/or at least one aromatic polyisocyanate prepolymer.

5. The plastic moldings of claim 1, wherein b2) and b3) have a number average molecular weight in the range of from about 400 to about 10,000 and have from about 1 to about 8 primary and/or secondary hydroxyl groups.

6. The plastic moldings of claim 1, wherein b1) comprises one or more polyether polyols and/or one or more polyester polyols having a number average molecular weight of from about 2000 to about 16,000 and having a functionality of from about 2 to about 6.

7. A process for the preparation of plastic moldings having a density of at least $0.8$ $g/cm^3$ and which comprise optionally filled polyurethanes, comprising reacting:
   a) at least one polyisocyanate and/or polyisocyanate prepolymer;
   b) an isocyanate-reactive component comprising:
      b1) at least one polyol component,
      and at least one filler-containing polyol component selected from the group consisting of:
      b2) one or more polyol dispersions containing polyurea, and
      b3) at least one polydispersions containing polyisocyanate polyaddition products with alkanolamines;
   c) at least one chain extender and/or crosslinking agent and which contains from 2 to 6 hydroxyl groups per molecule and has a molecular weight of 62 to 499;
   d) at least one trimerization catalyst;
   e) optionally, one or more urethane catalysts;
   f) optionally, one or more blowing catalysts;
   g) optionally, one or more stabilizers and/or auxiliary substances;
   and
   h) optionally, one or more reinforcing agents, at an isocyanate index of 200 to 1000.

* * * * *